US009696826B2

(12) United States Patent
Holsen

(10) Patent No.: US 9,696,826 B2
(45) Date of Patent: Jul. 4, 2017

(54) STYLUS WITH LOW-POWER DETECTOR

(71) Applicant: Atmel Corporation, San Jose, CA (US)

(72) Inventor: Eivind Holsen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 190 days.

(21) Appl. No.: 14/788,637

(22) Filed: Jun. 30, 2015

(65) Prior Publication Data

US 2017/0003767 A1    Jan. 5, 2017

(51) Int. Cl.
*G06F 3/038*   (2013.01)
*G06F 3/0354*   (2013.01)
*G06F 3/041*   (2006.01)
*G06F 3/044*   (2006.01)
*G06F 3/03*   (2006.01)

(52) U.S. Cl.
CPC ............. *G06F 3/0383* (2013.01); *G06F 3/03* (2013.01); *G06F 3/03545* (2013.01); *G06F 3/044* (2013.01); *G06F 3/0416* (2013.01)

(58) Field of Classification Search
CPC .... G06F 3/03545; G06F 3/0416; G06F 3/044; G06F 3/03; G06F 3/0383
See application file for complete search history.

(56) References Cited

U.S. PATENT DOCUMENTS

| | | | |
|---|---|---|---|
| 6,529,189 B1 * | 3/2003 | Colgan | G06F 3/038 178/18.01 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2008/0309635 A1 | 12/2008 | Matsuo | |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Andrew Sasinowski
*Assistant Examiner* — Kelly Hegarty
(74) *Attorney, Agent, or Firm* — Baker Botts L.L.P.

(57) ABSTRACT

In one embodiment, a stylus includes a receiver for receiving signals wirelessly transmitted by a device. The stylus can alternate, during a first period of time, power supplied to the receiver between a first power for a first duration and a second power for a second duration. The first power is greater than the second power. The stylus can determine how many events exceeding an event criteria occurred the each first duration, and if the events exceed a threshold, the stylus can initiate wakeup components in the stylus for communicating with the device by initiating a provision of third power to those components. The third power is greater than the first power. When the first period of time expires, the stylus can provide low power to the receiver for a second period of time.

20 Claims, 9 Drawing Sheets

(56) References Cited

U.S. PATENT DOCUMENTS

| | | |
|---|---|---|
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0176495 A1* | 6/2014 | Vlasov .................... G06F 3/044 345/174 |
| 2016/0048234 A1* | 2/2016 | Chandran ................ G06F 3/044 345/174 |
| 2016/0209940 A1* | 7/2016 | Geller .................... G06F 3/0416 |
| 2016/0266663 A1* | 9/2016 | Holsen .................... G06F 3/041 |
| 2016/0378257 A1* | 12/2016 | Oakley .................... G06F 3/03 345/175 |

* cited by examiner

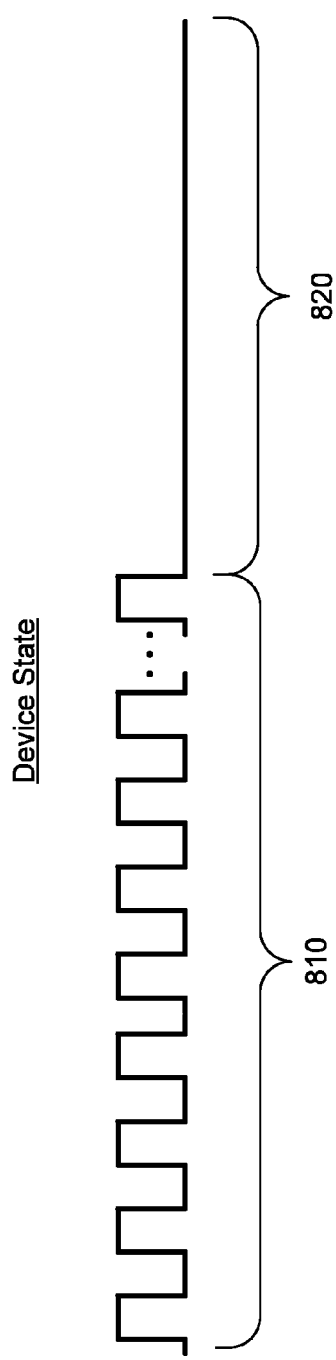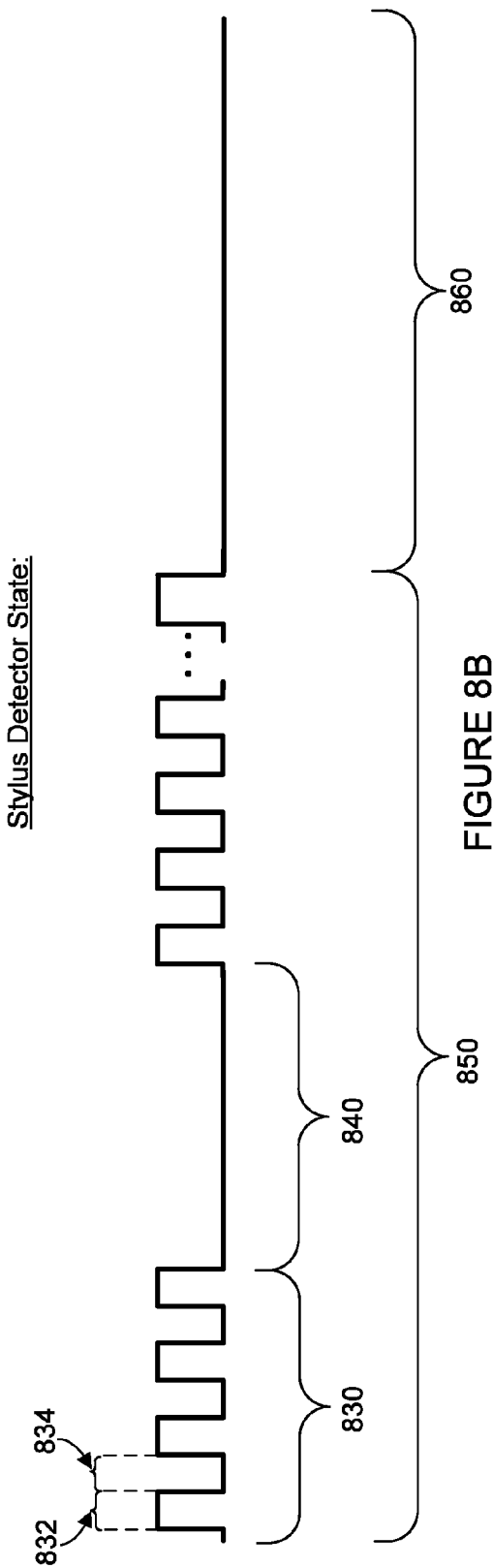

STYLUS WITH LOW-POWER DETECTOR

TECHNICAL FIELD

This disclosure generally relates to a stylus that can receive signals.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. A touch sensor may periodically scan conductive elements of the touch sensor to determine whether an object is in proximity of a portion of the touch sensor. When an object touches or comes within proximity of the surface of a capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIGS. 8A-B illustrate examples states of a device and of a low-power detector of a stylus.

DESCRIPTION OF EXAMPLE EMBODIMENTS

Figure 1:
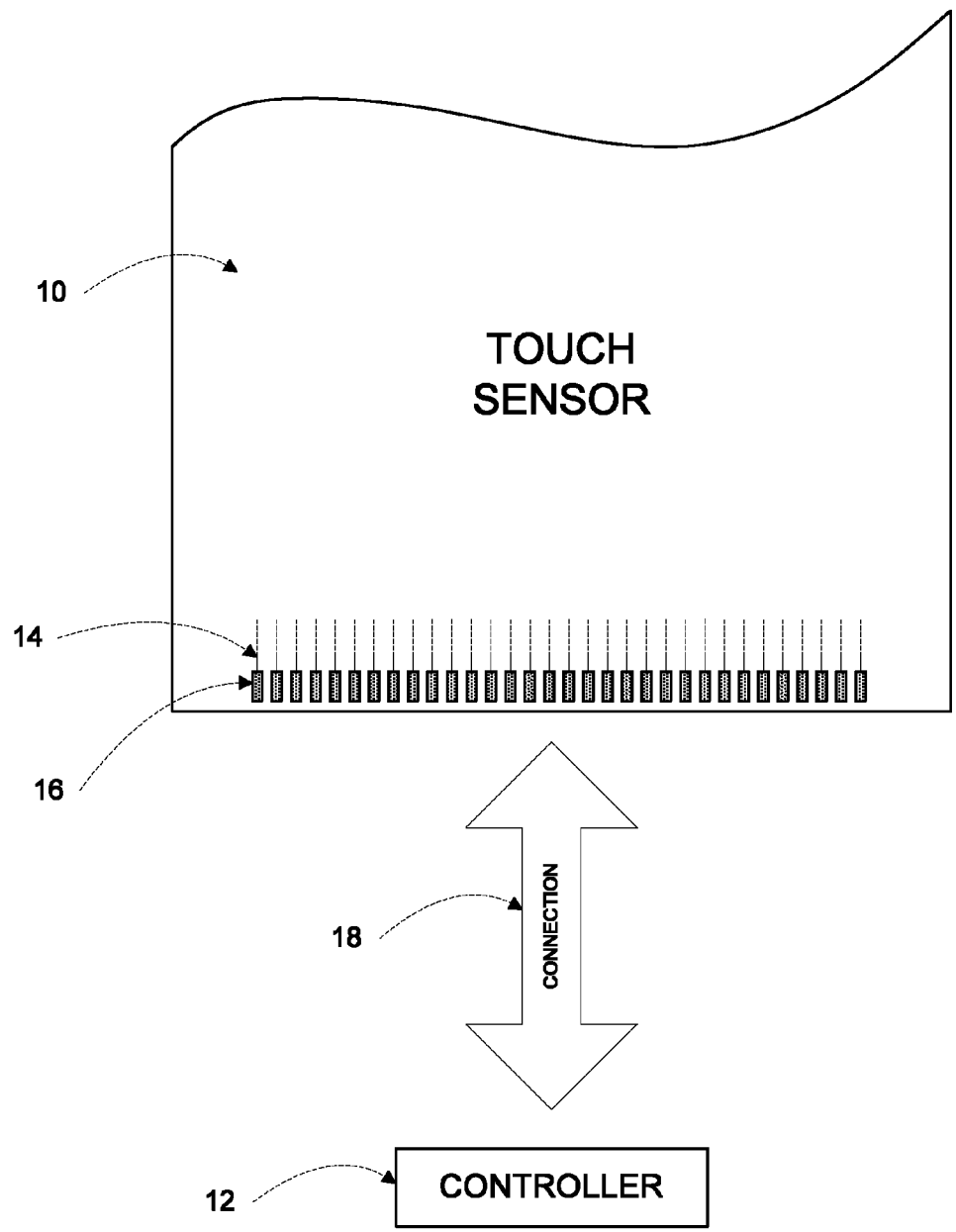
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, carbon, or a copper-, silver-, or carbon-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space, or gap, between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable maals with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
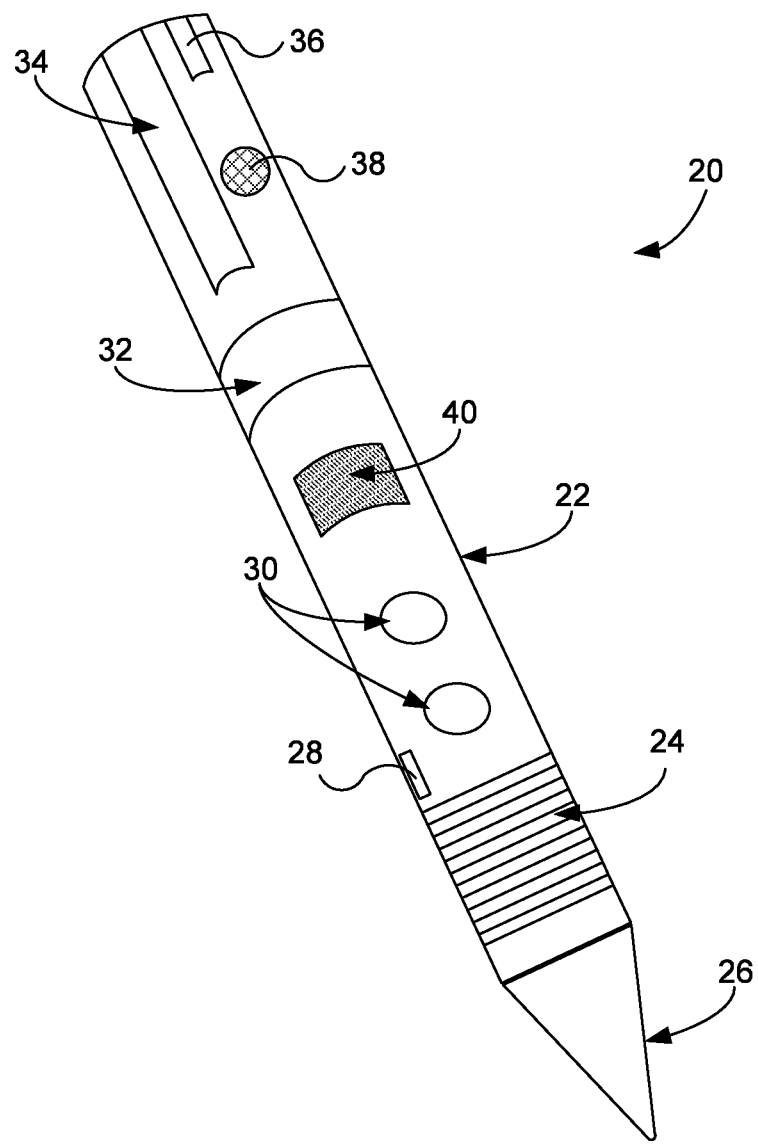
FIG. 2 illustrates an example stylus exterior.

FIG. 2 illustrates an example exterior of an example stylus 20, which may be used in conjunction with touch sensor 10 of FIG. 1. In particular embodiments, stylus 20 is powered (e.g., by an internal or external power source) and is capable of providing touch or proximity inputs to a touch sensor (e.g., touch sensor 10 illustrated in FIG. 1). Stylus 20 may include one or more components, such as buttons 30 or sliders 32 and 34 integrated with an outer body 22. These external components may provide for interaction between stylus 20 and a user or between a device and a user. As an example and not by way of limitation, interactions may include communication between stylus 20 and a device, enabling or altering functionality of stylus 20 or a device, or providing feedback to or accepting input from one or more users. The device may be any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Stylus 20 may have any suitable dimensions with outer body 22 made of any suitable material or combination of materials, such as, for example and without limitation, plastic or metal. In particular embodiments, exterior components (e.g., 30 or 32) of stylus 20 may interact with internal components or programming of stylus 20 or may initiate one or more interactions with one or more devices or other styluses 20.

As described above, actuating one or more particular components may initiate an interaction between stylus 20 and a user or between the device and the user. Components of stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of stylus 20, while one or more wheel sliders 32 may be aligned around the circumference of stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using an FPC.

Stylus 20 may have one or more components configured to provide feedback to or accept feedback from a user, such as, for example and without limitation, tactile, visual, or audio feedback. Stylus 20 may include one or more ridges or grooves 24 on its outer body 22. Ridges or grooves 24 may have any suitable dimensions, have any suitable spacing between ridges or grooves, or be located at any suitable area on outer body 22 of stylus 20. As an example and not by way of limitation, ridges 24 may enhance a user's grip on outer body 22 of stylus 20 or provide tactile feedback to or accept tactile input from a user. Stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of stylus 20. Stylus 20 may include one or more visual feedback components 36, such as a light-emitting diode (LED) indicator or an electrophoretic display. As an example and not by way of limitation, visual feedback component 36 may indicate a power status of stylus 20 to the user.

One or more modified surface areas 40 may form one or more components on outer body 22 of stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionality. For example and not by way of limitation, dragging a finger across modified surface area 40 may initiate an interaction, such as data transfer, between stylus 20 and a device.

One or more components of stylus 20 may be configured to communicate a signal or data between stylus 20 and a device. In particular embodiments, stylus 20 may have a tip 26 located at an end of stylus 20, and tip 26 may include one or more electrodes configured to communicate data between stylus 20 and one or more devices or other styluses. By way of example and without limitation, the electrodes of stylus 20 may reside on outer body 22 of stylus, in active-stylus tip 26, or on or in any other suitable part of stylus 20. Tip 26 may provide or communicate pressure information (e.g., the amount of pressure being exerted by stylus 20 through tip 26) between stylus 20 and one or more devices or other styluses. Tip 26 may be made of any suitable material, such as a conductive material, and have any suitable dimensions, such as, for example, a diameter of 1 mm or less at its terminal end. Stylus 20 may include one or more ports 28 located at any suitable location on outer body 22 of stylus 20. Port 28 may be configured to transfer signals or information between stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to stylus 20.

Figure 3:
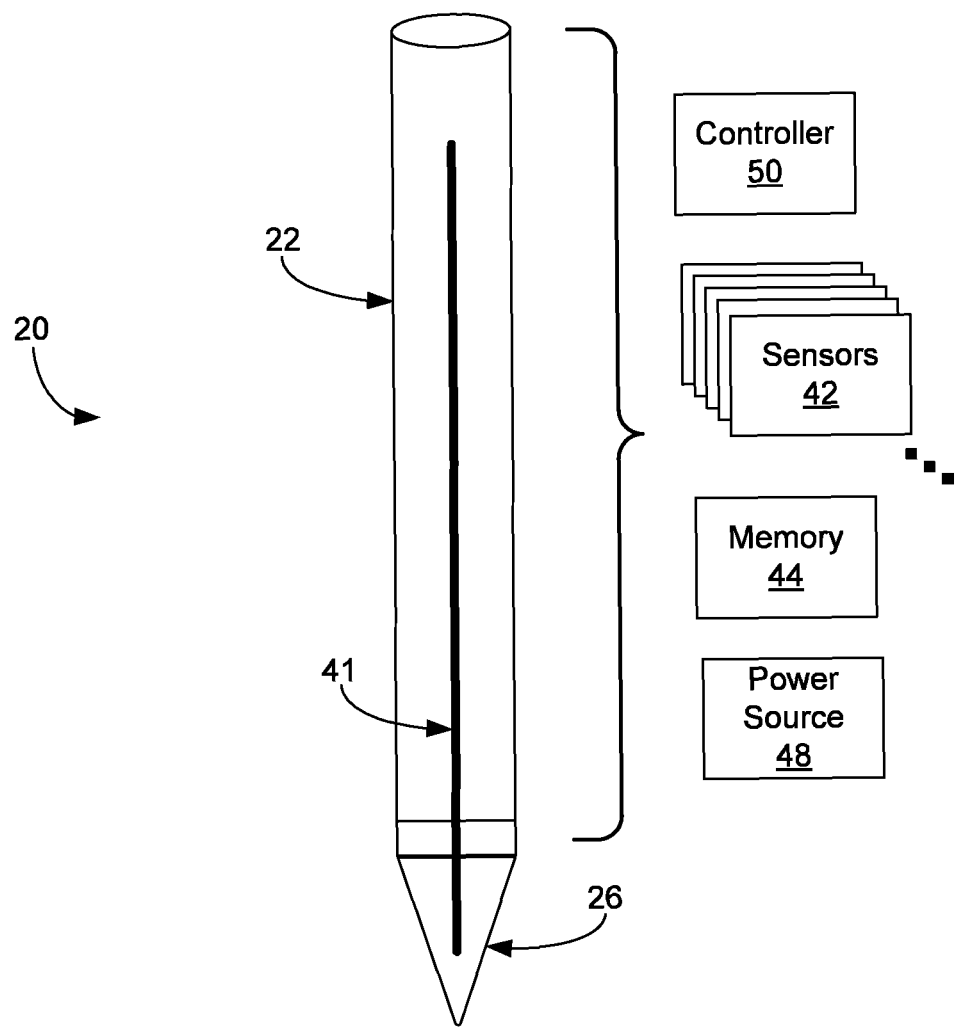
FIG. 3 illustrates an example stylus interior.

FIG. 3 illustrates example internal components of an example stylus 20. Stylus 20 includes one or more components, such as a controller 50, sensors 42, memory 44, or power source 48. In particular embodiments, one or more components may be configured to provide for interaction between stylus 20 and a user or between a device and a user. In other particular embodiments, one or more internal components, in conjunction with one or more external components described above, may be configured to provide interaction between stylus 20 and a user or between a device and a user. As an example and not by way of limitation, interactions may include communication between stylus 20 and a device, enabling or altering functionality of stylus 20 or a device, or providing feedback to or accepting input from one or more users. As another example, stylus 20 may communicate via any applicable short distance, low energy data transmission or modulation link, such as, for example and without limitation, via a radio frequency (RF) communication link. In this case, stylus 20 includes a RF device for transmitting data over the RF link.

Controller 50 may be a microcontroller or any other type of computing device or processor suitable for controlling the operation of stylus 20. Controller 50 may be one or more ICs—such as, for example, general-purpose microprocessors, microcontrollers, programmable logic devices (PLDs), programmable logic arrays (PLAs), or ASICs. Controller 50 may include a processor unit, a drive unit, a sense unit, and a storage unit. In particular embodiments, a processor unit in controller 50 may control the operation of electrodes in stylus 20, either via drive or sense units or directly. The drive unit may supply signals to electrodes of tip 26 through center shaft 41. The drive unit may also supply signals to control or drive sensors 42 or one or more external components of stylus 20. In particular embodiments, the drive unit of stylus 20 may be configured to transmit a signal that may be detected by electrodes of touch sensor 10. As an example and not by way of limitation, the drive unit of stylus 20 may include a voltage pump or a switch, such that the voltage pump may generate a high voltage signal, or the switch may toggle the potential of tip 26 between zero voltage and one or more pre-determined voltage levels. The drive unit of stylus 20 may transmit a signal, such as a square wave, sine wave, or digital-logic signal, that may be sensed by the electrodes of touch sensor 10. In particular embodiments, the drive unit of stylus 20 may transmit a signal to the electrodes of touch sensor 10 by applying a voltage or current to electrodes of tip 26 that results in charge removal or charge addition to the electrodes of touch sensor 10, mimicking a touch or anti-touch of a finger on a pulse-by-pulse basis.

The sense unit may sense signals received by the stylus, for example by electrodes of tip 26 through center shaft 41, and may provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, stylus 20 may include one or more sensors 42, such as touch sensors, gyroscopes, accelerometers, contact sensors, or any other type of sensor that detect or measure data about the environment in which stylus 20 operates. Sensors 42 may detect and measure one or more characteristic of stylus 20, such as acceleration or movement, orientation, contact, pressure on outer body 22, force on tip 26, vibration, or any other suitable characteristic of stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by stylus 20 or the device. In particular embodiments, data detected or received by sensors 42 may be stored in memory 44. Memory 44 may be any form of memory suitable for storing data in stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of stylus 20. In particular embodiments, power source 48 may include a primary battery, such as for example an alkaline battery, or a rechargeable battery, such as for example a lithium-ion or nickel-metal-hydride battery. In particular embodiments, power source 48 may be charged by energy from a user or device. As an example and not by way of limitation, power source 48 may be a rechargeable battery that may be charged by motion induced on stylus 20. In other particular embodiments, power source 48 of stylus 20 may provide power to or receive power from the device or other external power source. As an example and not by way of limitation, power may be inductively transferred between power source 48 and a power source of the device or another external power source, such as a wireless power transmitter. Power source may also be powered or recharged by a wired connection through an applicable port coupled to a suitable power source.

Figure 4:
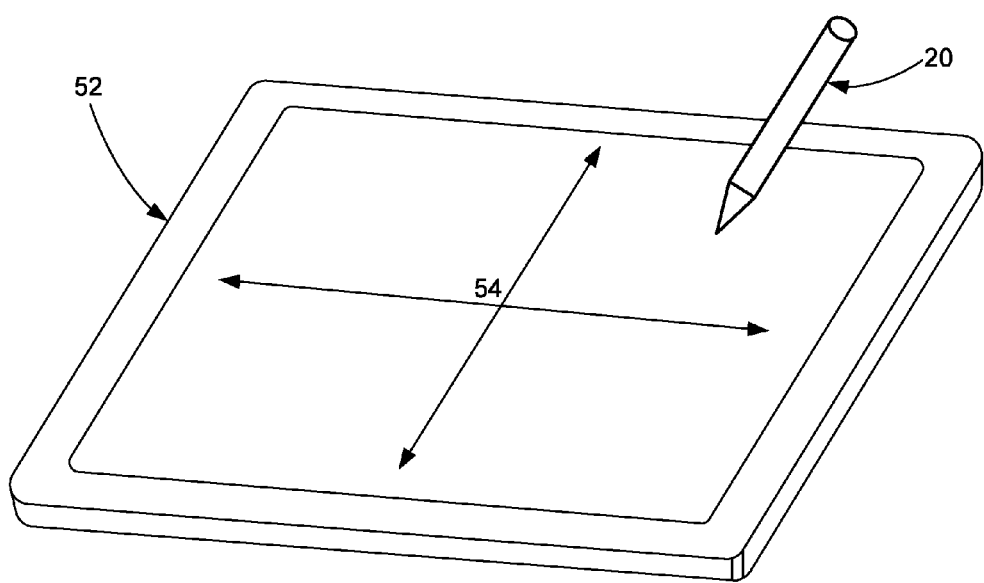
FIG. 4 illustrates an example stylus with an example device.

FIG. 4 illustrates an example stylus 20 with an example device 52. Device 52 may include a touch sensor similar to touch sensor 10 of FIG. 1. Device 52 may be any suitable device that may or may not include a touch sensor, such as, for example and without limitation, a desktop computer, laptop computer, tablet computer, personal digital assistant (PDA), smartphone, satellite navigation device, portable media player, portable game console, kiosk computer, point-of-sale device, or other suitable device. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As an example and not by way of limitation, device 52 electronics may include circuitry or other electronics for wireless communication to or from device 52, executing programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, stylus 20 and device 52 may be synchronized prior to communication of data between stylus 20 and device 52. As an example and not by way of limitation, stylus 20 may be synchronized to device 52 through a pre-determined bit sequence transmitted by the touch sensor of device 52. As another example, stylus 20 may be synchronized to device 52 by processing a drive signal transmitted by drive electrodes of the touch sensor of device 52. Stylus 20 may interact or communicate with device 52 when stylus 20 is brought in contact with or in proximity to touch-sensitive area 54 of the touch sensor of device 52. In particular embodiments, interaction between stylus 20 and device 52 may be capacitive or inductive. As an example and not by way of limitation, when stylus 20 is brought in contact with or in the proximity of touch-sensitive area 54 of device 52, signals generated by stylus 20 may influence capacitive nodes of touch-sensitive area of device 52 or vice versa. In particular embodiments, interaction between stylus 20 and device 52 may occur when tip 26 of stylus 20 is in contact with or in proximity to device 52. As an example and not by way of limitation, stylus 20 may transmit tip pressure information (e.g., an amount of pressure being applied to tip 26) to device 52. As another example and not by way of limitation, stylus 20 may transmit a status of a button or switch (e.g., button 30 is pressed or in a closed state; or button 30 is not pressed or is in an open state) to device 52. A user may press a button 30 while stylus 20 is in proximity of touch-sensitive area 54 of device 52, and based on the button 30 being pressed, stylus 20 may interact with device 52 to initiate a mouse-type function, such as for example, a mouse click (e.g., a left, right, or middle mouse click) or a mouse hover. Although this disclosure describes particular interactions and communications between stylus 20 and device 52, this disclosure contemplates any suitable interactions and communications through any suitable means, such as mechanical forces, current, voltage, or electromagnetic fields.

In particular embodiments, one or more measurement signals from sensors 42 of stylus 20 may initiate, provide for, or terminate interactions between stylus 20 and one or more devices 52 or one or more users, as described above.

Interaction between stylus 20 and device 52 may occur when stylus 20 is contacting or in proximity to device 52. As an example and not by way of limitation, a user may perform a gesture or sequence of gestures, such as shaking or inverting stylus 20, whilst stylus 20 is hovering above touch-sensitive area 54 of device 52. Stylus may interact with device 52 based on the gesture performed with stylus 20 to initiate a pre-determined function, such as authenticating a user associated with stylus 20 or device 52. Although this disclosure describes particular movements providing particular types of interactions between stylus 20 and device 52, this disclosure contemplates any suitable movement influencing any suitable interaction in any suitable way.

Stylus 20 may receive signals from external sources, including a suitable device (such as device 52) a user, or another stylus. Stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which stylus 20 communicates, the physical layout of the system, sensor noise, charger noise, device noise, noise from device 52 display, stylus circuitry noise, or external noise. The overall noise external to stylus 20 may have frequency characteristics covering a wide range of the spectrum, including narrow-band noise and wide-band noise, as well. In particular embodiments, a stylus may determine whether a received signal is consider noise or a communication from a device. For example, a stylus may compare a signal to a noise threshold and deem received signals as noise signals if they fail to meet the noise threshold. A stylus may remove any portion of a signal deemed to be noise and process the remaining signal as a communication signal.

In particular embodiments, a signal may be received by one or more electrodes capable of sensing signals in stylus 20. These electrodes may reside on or within active-stylus tip 26. The signal received by the electrodes in stylus 20 may then be transmitted from the electrodes to controller 50. In particular embodiments, a signal may be transmitted to controller 50 via center shaft 41. Controller 50, as discussed above, may include, without limitation, a drive unit, a sense unit, a storage unit, and a processor unit. In particular embodiments, a received signal may be amplified by any suitable amplifier, including a digital or an analog amplifier. In particular embodiments, a received signal may be filtered by any suitable filter, including a digital or an analog filter. In particular embodiments, device 52 may transmit data to stylus 20 by sending data to one or more drive electrodes of touch sensor 10, and stylus 20 may receive data via electrodes of tip 26. In particular embodiments, after stylus 20 and device 52 are synchronized, stylus 20 may transmit data to device 52 by performing charge addition or charge removal on one or more sense electrodes of touch sensor 10, and device 52 may receive data sent from stylus 20 by sensing data with one or more sense electrodes of touch sensor 10.

As described above, a stylus may receive and process wireless signals transmitted from another device. The stylus may include a detector for detecting signals received by the stylus. In particular embodiments, the detector may include a receiver for receiving the signals and circuitry for processing and/or evaluating the signals. In particular embodiments, a stylus may include a single detector that includes multiple functions or several detectors that each performs one function or multiple functions. For example, one detector may be used to detect whether a signal from a device is received by the stylus (e.g., whether a device is in proximity of the stylus and is attempting to communicate with the stylus) and another detector may be used to detect particular characteristics of a signals, such as the signal's frequency, modulation characteristics, amplitude, or another other suitable characteristic. In particular embodiments, a detector that detects characteristics of a signal may be used to synchronize a device with a stylus.

In particular embodiments, a stylus may include components for detecting signals from a device, such as a low-power detector, and components for communicating with the device. In particular embodiments, components for communicating with the device may include one or more high-power components that require more power to operate than does the low-power detector. For example, high-power components may include a high-resolution digital oscillator, and may include filters and other circuitry that requires relatively high power for, e.g., processing or evaluating signals received from the device or to be transmitted to the device. In particular embodiments, a relatively low-power detector may be used for signal detection and relatively high-power components may be used for more demanding communications, such as synchronization. Thus, high-power communication components may not be activated until a signal is detected and those high-power components can be of use. In addition or the alternative, in particular embodiments a low-power detector may provide faster response time than high-power communication components. As an example, a low-power detector may power on to an operational state in less time than would take high-power communication components to power on to an operational state.

Figure 5:
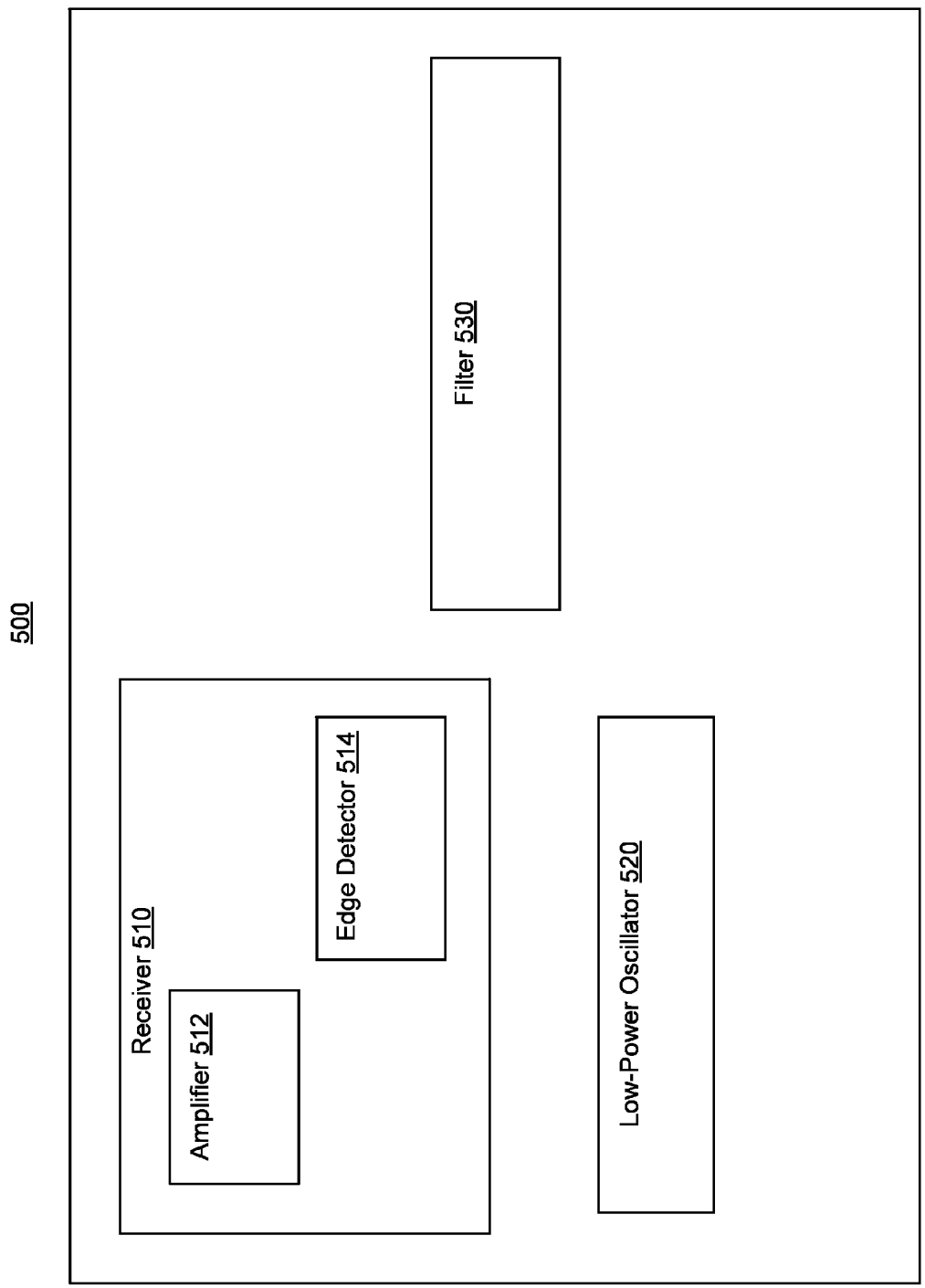
FIG. 5 illustrates an example low-power detector for detecting the presence of one or more signals transmitted by a device.

FIG. 5 illustrates an example low-power detector 500 for detecting the presence of one or more signals transmitted by a device. Detector 500 may include any suitable components for receiving, detecting, and processing signals from a device. For example, detector 500 may include a receiver 510 for receiving signals from a device. In particular embodiments, receiver 510 may include a conductive element, such as an electrode, that can sense an electric or electromagnetic field. In particular embodiments, receiver 510 may include circuitry for processing received signals. For example, receiver 510 may include one or more amplifiers 512 for amplifying a received signal or a component of a received signal. In particular embodiments, a receiver may include circuitry for determining one or more characteristics of a received signal, such as the signal's frequency, amplitude, modulation, or the like. For example, in particular embodiment's receiver 510 may include one or more event detectors, such as edge detector 514, for detecting a suitable event, such as one or more edges of a square-wave signal, as described more fully herein.

In particular embodiments, detector 500 may include or be coupled to a clock, such as a low power oscillator 520, which may be an ultra-low-power oscillator. As an example, low-power oscillator 520 may oscillate at a frequency of 125 kHz. This disclosure contemplates any suitable low-power oscillator oscillating at any suitable frequency. In particular embodiments, a low-power oscillator may be part of and/or coupled to any suitable stylus electronics, such as a microcontroller. In particular embodiments, detector 500 may include a controller, such as a microcontroller or other suitable processing electronics, for controlling one or more components of detector 500.

In particular embodiments, detector 520 may include circuitry able to detect one or more characteristics of a received signal. As an example, event detector 514 may detect one or more characteristics of a signal. In particular embodiments, event detector 514 may determine whether one or more characteristics of a signal meets an event criteria, such as signal level, a signal-to-nose level, a frequency, a rate of change, or any other suitable characteristic. For example, event detector 514 may determine whether an amplitude of a detected signal exceeds a threshold amplitude. In particular embodiments, detector 500 may include at least one filter 530, such as a digital asynchronous filter, which receives output from receiver 510. For example, filter 530 may receive the output of edge detector 514 and count the quantity, or number, of events, such as edges, received during any suitable duration. Filter 530 may be able to count any suitable number of events. In particular embodiments, filter 530 may store a value identifying the number of detected events during one or more cycles of a clock used for powering receiver 510, such as a clock cycle of low-power oscillator 520. In particular embodiments, filter 530 may reset the value identifying the number of detected events to any suitable pre-determined starting value based on any suitable parameter, such as after any suitable duration.

Figure 6:
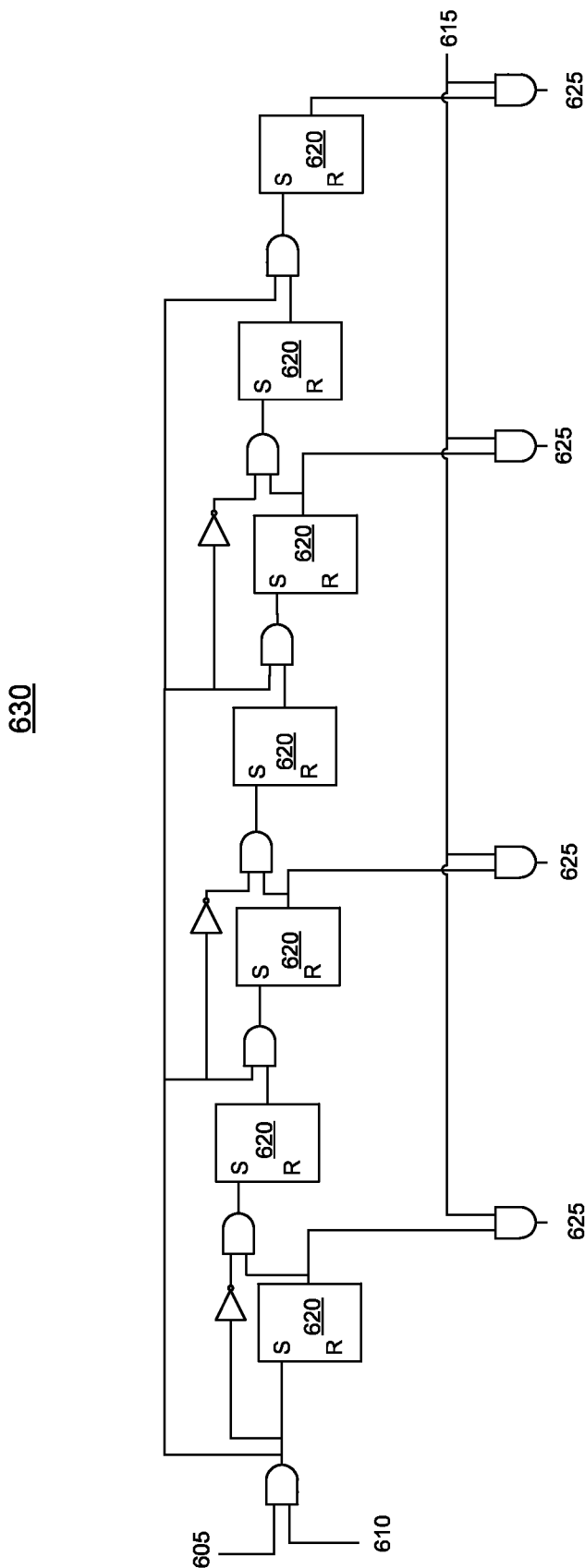
FIG. 6 illustrates example electronics of a digital asynchronous filter

FIG. 6 illustrates example electronics of digital asynchronous filter 630. Filter 630 may include 605 from, e.g., edge detector 514, one or more latches 620 for counting the quantity, or number, of events, and qualifying input 610 and output 615 to ensure that accurate counts of events are maintained, to prevent the asynchronous filter from entering metastable states, and/or to reset a value identifying the stored number of events. For example, qualifying input 610 may be used to ensure that filter 630 counts events only when the appropriate qualifying input 610 is supplied, and/or to reset the values stored by filter 630. As another example, qualifying output 615 may be used to ensure that false positives aren't output 625 by latches 620, e.g., during powering on of detector 500. In particular embodiments, filter 630 may be asynchronous to the stylus's system clock connected to the bus, allowing the filter to detect more than one event output from an edge detector per clock cycle the system clock.

Filter 630 may include any suitable number of laches 620 for determining a number of detected events. In particular embodiments, some or all of the laches 620 may be used to detect events, depending on a desired threshold. For example, if the threshold value of detected events is four, then four outputs 625 may be used. In that embodiment, filter 630 may have four outputs, or may have more than four outputs. This disclosure contemplates any suitable filter for determining the number of events detected by a stylus receiver. This disclosure further contemplates that the filter may have any suitable electronics, such as any suitable latches of any suitable type, for detecting the number of events detected by a stylus receiver.

Figure 7:
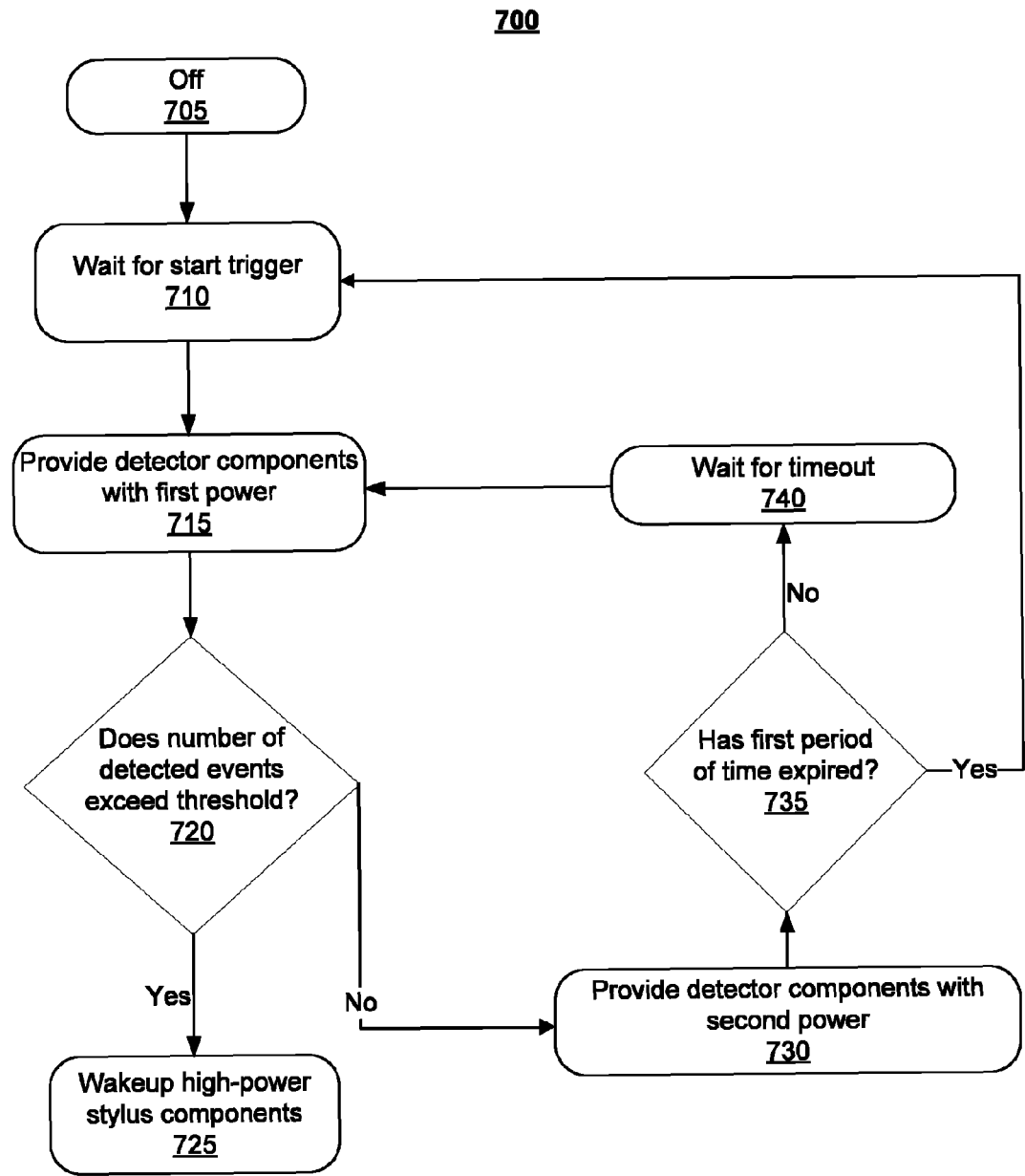
FIG. 7 illustrates an example method for detecting one or more signals from a device

As described herein, a detector of a stylus, such as low-power detector 500, may be used to detect one or more signals from a device. FIG. 7 illustrates an example method for detecting one or more signals from a device. At step 705, stylus components for detecting signals from a device may be powered off, which in particular embodiments may mean that the components use no power or very low power such that the components are not fully operational, e.g., to perform their detection operations. At step 710, low-power detector components for detecting signals from a device are powered on. For example, a low-power oscillator may be powered on, a low-power counter may be powered on, a timer used by the system (e.g., to detect edges may be powered on), or any suitable combination thereof may be powered on. This disclosure contemplates any suitable method of enabling detector components. For example, detector components may be enabled by a power button operable by a user of the stylus, by a sensor such as an accelerometer or grip/pressure sensor, and/or by a timeout of a sleep mode of the detector.

At step 710, the detector system waits for a suitable measurement trigger. For example, a measurement trigger may be a timeout of a low-power mode of the low-power detector, as described more fully herein. When the measurement trigger occurs, the method moves to step 715, where the detector provides power to components for receiving signals from a device, such as for example receiver 510 of FIG. 5 and, in particular embodiments, filter 530. The components are provided with a first power for a first duration so that the components perform their respective operations during the first duration. Providing the components with power (i.e., the transition from step 710 to step 715) may take a startup time, which may be, for example 1 to 1.5 periods of a cycle of a low-power oscillator. The components for receiving signals from a device measure received signals for a first duration at step 715. As described more fully in FIG. 8, the first duration may be any suitable period of time and may be configurable based on any suitable factors. In particular embodiments, during the first duration the detector updates a value identifying a quantity, or number, of detected events that occurred during the first duration. In particular embodiments, as described more fully herein, a detected event may be any event, such as an edge of a square-wave signal that exceeds a detection threshold. In particular embodiments, detected signals may be processed or evaluated, such as for example by removing noise from the detected signal, amplifying the detected signals, or any other suitable processing or evaluation.

At step 720 the detector, for example based on the output of filter 530, determines whether a quantity of events detected during the first duration meets and/or exceeds a threshold value. In particular embodiments, the determination may occur as the first period is occurring, i.e., the detector periodically or continuously monitors the value identifying the quantity of detected events and, when the quantity exceeds the threshold value, the first duration ends. In particular embodiments, the determination may occur at a particular time period, such as for example at the end of, or after, the end the measurement period corresponding to step 715.

When the value identifying the quantity of detected events exceeds a threshold value, method 700 may continue to step 725, where a wake-up of additional components for communicating with the stylus occurs. Such components may, for example, synchronize communications between the stylus and the device. Example synchronization components and their associated functionalities are described more fully herein. In particular embodiments, the additional components consume substantially more power than the low-power detector components of detector 500. As described herein, in particular embodiments the additional components perform more advanced functionality than do the low-power detector, such as for example detection of a communication frequency, locking onto a signal, authentication, synchronization of signals transmitted between the stylus and the device, or any other suitable functionality. In particular embodiments, the high-power components may be coupled to and use a portion of the components and/or circuitry used by the low-power detector, such as, for example, the amplifiers 512 and edge detector 514 of FIG. 5.

When the value identifying the quantity of detected events does not exceed a threshold value, the method may move to step 730, where the low-power detectors components, e.g., the components of receiver 510, are provided with a second power. The second power is lower than the first power, and may be identical to an off-mode power or sleep-mode power, or any suitable power less than the first power. At step 735, the method may determine whether a timeout has occurred for a first period of time that encompasses periods where the first power is supplied to the low-power detector components for the first duration and the second power is supplied to low-power detector components for a second duration. If the first period of time has not expired, then at step 740 low-power detector components may be supplied with the second power for the second duration. In particular embodiments, the second duration of time may be equal to the first duration of time. In particular embodiments, the second duration may be configurable based on any suitable factor, as described more fully below. In particular embodiments, during the first period of time the method may alternate between instances of the first duration and instances of the second duration. For example, during or after step 740, method 700 may determine that the second duration has ended, and the method may then return to step 715. The number of times method 700 alternates between steps 715 and steps 740 according to the method, which in particular embodiments may be identical to the length of the first period of time, may be configurable and/or based on any suitable factors.

If the first period of time has expired, the method may move from step 735 to step 710, during which the low-power detector components are provided with low power. The low power may be the same as the second power. Each instance of step 710 that was preceded by step 735 may last for a second period of time, after which the method may continue to step 715. In particular embodiments, method 700 may alternate between step 710 and steps 715-740 any suitable number of times. In other words, method 700 may alternate between the first period of time and the second period of time any suitable number of times. Method 700 may end in any suitable way, such as for example based on a timeout for method 700, based on a input from a user powering the stylus off (e.g., to Step 705) such as by activating a power button or switch, or when step 725 occurs. In particular embodiments, when high-power components of the stylus are powered on, the stylus may return to method 700 (e.g., to step 710) based on any suitable factor, such as based on a suitable signal from the device or when the high-power components do not detect a communication, or a particular type of communication, from the detector for a particular period of time. For example, when the high-power components are activated, the stylus may power off those components and return to step 710 if a communication is not sensed from, e.g., a touch sensor for a duration of approximately 100 milliseconds. In particular embodiments, the stylus may return to step 710 when a signal strength falls below a certain threshold. For example, a stylus and a touch sensor may communicate when the stylus is near the touch sensor, e.g., 5 cm above the touch sensor, but signal fidelity for distances larger than 5 cm may be reduced, and the stylus may return to step 710 if receiving such signals or receiving such signals for a particular amount of time. Likewise, in particular embodiments, communication components of a device, such as a touch sensor, may also enter a low-power mode, such as a sleep mode or an off mode, when communication signals form the stylus are not received for a particular amount of time or fail to meet a particular criterion, such as a certain signal strength or a certain signal-to-noise threshold. In particular embodiments, the durations of the first duration, the second duration, the first period of time, or the second period of time may be configurable by the stylus, the device, a user of the stylus or device, or any suitable combination thereof.

In particular embodiments, method 700 may be performed for a particular duration. For example, steps 710-740 may be repeatedly performed unless, in particular embodiments, step 725 is performed, a user powers off the stylus, or a timeout for method 700 occurs. As an example, method 700 may be performed for a third period of time that includes one or more instances of the first period of time (i.e. the first and second durations corresponding to steps 715 and 740, respectively) and one or more instances of the second period of time. When such a timeout occurs, the stylus may provide the low-power detector components, such as the receiver, with low power for a fourth period of time. In particular embodiments, the low power provided during the fourth period of time may be substantially the same as the second power. In particular embodiments, the low power provided during the fourth period of time may be substantially no power, for example by returning to step 705. In particular embodiments, the second power may also be substantially no power. In particular embodiments, a timeout for method 700 may be based on a predetermined duration during which no events, or only a predetermined number of events, are detected by the stylus. In particular embodiments, one or more instances of any or all of the first, second, third, and fourth periods of time may each have a predetermined duration. In particular embodiments, one or more instances of any or all of the first, second, third, and fourth periods of time may each have a variable duration.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7. Moreover, while the descriptions herein regarding FIG. 7 and descriptions made elsewhere describe a first event occurring "when" a second event occurs, such as when a determination is made or a timeout occurs, this disclosure contemplates that any suitable first event may occur based at least on the occurrence of the second event, including based on a determination or indication that the second event has occurred. Thus, the first event may not necessarily occur immediately after or within any particular time of the second event, and the occurrence of the second event may be a necessary, but not sufficient, condition for the occurrence of the first event.

FIGS. 8A-B illustrate examples of signals transmitted by a device and received by a low-power detector of a stylus. In particular embodiments, the signals and timing illustrated in FIGS. 8A-B may be used during corresponding steps of method 700 of FIG. 7. FIG. 8A illustrates example signals transmitted by a device, such as by a touch sensor of a device. In particular embodiments, the signals may be periodic signals having a particular frequency and waveform. For example, a touch sensor may transmit a square wave having a frequency of approximately 100 kHz to several MHz. As described more fully herein, a transmission may result from scans performed by the touch sensor of its sense or drive lines to detect the presence of an object in the vicinity of the touch sensor. This disclosure contemplates any suitable signals having any suitable frequency or waveform. In particular embodiments, as illustrated in FIG. 8A, transmitted signals may be transmitted for a transmission period of time 810. This disclosure contemplates any suitable duration of transmission period 810. For example, when the signals are transmitted from a touch sensor, a scan of the touch sensor may take a particular amount of time to scan each drive or sense lien being scanned, such as for example 0.5 milliseconds to 2 milliseconds. In particular embodiments, transmission period 810 may be followed by a sleep or idle state 820 where signals are not transmitted from the device. For example, a 0.5 milliseconds transmission may be followed by state 820, which may last for approximately 40 milliseconds. In particular embodiments, the transmitting device may alternate periodically between states 810 and 820. For example, the entire duration of state 810 plus state 820 may be approximately 40 milliseconds, after which states 810 and 820 repeat. In particular embodiments, when the device detects the presence of a stylus, such as for example by receiving an identifying communication from the stylus or a synchronizing signal from the stylus, the device may enter a high-power mode where transmission occur more frequently or at a different frequency. The high-power mode may also include additional processing and signal analysis, such as a synchronization process described more fully herein.

FIG. 8B illustrates example states of a low-power stylus detector, such as for example detector 500. As illustrated in FIG. 8B, the detector may have a first state 830 during which components of the detector for receiving and detouring signals may be powered on. State 830 may include instances of a first duration 832 during which the components are receiving a first, relatively high power, and instances of a second duration 834 during which the components are receiving a second, relatively low power. State 830 may alternate between instances 832 and 834 for a first period of time. State 810 may correspond to steps 710-740 of FIG. 7. A stylus detector may also include a state 840 during which components for receiving or detecting signals are powered for the second power during a second period of time. State 840 may correspond to step 710 following a "Yes" determination in step 735 of FIG. 7. A stylus detector may alternate between states 830 and 840 for a third period of time 850. After state 850, a stylus detector may enter a low-power sleep or idle mode for a fourth period of time 860. State 860 may correspond to state 705 of FIG. 7. The power provided during state 860 may be the same as, or less than, the second power. In particular embodiments, a stylus detector may alternate between states 850 and 860 any suitable number of times, such as until the stylus is powered completely off or until a trigger event, such as the event triggering 735, occurs.

Instances of first duration, the second duration, the first period of time, the second period of time, and the fourth period of time may last for any suitable duration, may be fixed, and/or may be configurable. For example, state 850 may last for, e.g., 1 to 64 milliseconds, and state 860 may last for, e.g., 0 to 256 milliseconds. In particular embodiments, an instance 832, an instance 834, or both may last for, e.g., 1 to 8 periods of a low-power clock or oscillator. In particular embodiments, state 840 may last for e.g., 4 to 66 period of a low-power clock. In particular embodiments, configuration of any suitable state of a stylus or a device may occur during or after a synchronization of the stylus and the device. In particular embodiments, the states of the stylus and and/or the device may be pre-configured.

In particular embodiments, a duration of any of the detector states may depend on the timing of signals sent by a device. For example, state 860, state 840, or both may be relatively longer when the device transmits signals more frequently or for a longer period of time. For example, if the device continuously transmits signals (i.e. is always in state 810) or has a relatively shorts state 820, then the sleep states 840, 860, or both may be relatively long. In those embodiments, states 830 and/or duration 832 may be relatively shorter, thus conserving power. Conversely, if the device transmits infrequently or very briefly (i.e. spends relatively little time in state 810 compared to 820), then first states 830 and/or 832 may be relatively longer while states 840 and/or 860 may be relatively shorter.

In particular embodiments, a duration of state 832 may depend on a number, or quantity, of events detected during that instance. For example, the duration of state 832 may be fixed unless the number of detected events, such as edges, exceeds a threshold value, in which case an additional duration may be added to state 832. In particular embodiments, the duration of state 832 may be fixed unless the number of detected events, such as edges, exceeds a threshold value, in which case state 832 may start over i.e. a new instance of state 832 may begin. The threshold value of the above examples may be any suitable value, such as for example zero.

In particular embodiments, the states of the device and of the stylus may be synchronized. As an example, state 830 may temporally overlap with, or occur during the same time as, state 810. As another example, state 832 should not occur only during state 820 of the device or entirely within a high or low portion of a square wave of state 810. For example, suppose that state 810 plus state 820 lasts for a device duration, and state 830 and state 840 last for a stylus duration. If the device duration is the same as the stylus duration, the stylus can still detect signals from the device as long as there is sufficient temporal overlap between state 810 and state 830 (the amount of overlap required may depend on, e.g., the event threshold described more fully herein). However, if: 1) the device duration and the stylus duration are the same; 2) state 810 does not temporally overlap with state 830; 3) the device alternates between states 810 and 820; and 4) the stylus alternates between states 830 and 840, then the stylus will not be able to sense the detector at any point during state 850. Thus, the states of the stylus and the device may be configured such that the above conditions do not all occur. In particular embodiments, occurrence of state 860 may be sufficient to break the conditions described above. In particular embodiment, after synchronization a stylus and a device may adjust the timing of their states to ensure that the conditions above do not occur. In particular embodiments, a stylus or device may adjust the timing of one of their own states when a communication is not detected for a predetermined period of time Herein, references to the timing of states and/or method steps and descriptions of when states and/or method steps occur contemplates that reasonable tolerance exists. As merely one example, two states may occur at the same time if there temporally overlap for at least 95% of the duration of one or both of the states.

In particular embodiments, an electronic device (e.g., stylus 20) may include a clock having a clock period, and the clock may produce a periodic electronic signal that oscillates between a high voltage state (e.g., 1.8 V, 2.5 V, 2.7 V, or 3.3 V) and a low voltage state (e.g., approximately 0 V). The clock period may be approximately equal to a duration of one cycle of the clock, which may be referred to as a clock cycle. The frequency of the clock may be approximately equal to the inverse (or, reciprocal) of the clock period. As an example and not by way of limitation, a high-power stylus clock may have a clock frequency between approximately 3 and 25 MHz, and that stylus clock may have a clock period between approximately 40 and 340 nanoseconds. As another example and not by way of limitation, stylus 20 (which may be referred to as stylus 20) may have a high-power clock with a clock frequency of approximately 3 MHz, 6 MHz, 12 MHz, or 24 MHz, and the stylus clock may have a corresponding clock period of approximately 333 nanoseconds, 167 nanoseconds, 83 nanoseconds, or 42 nanoseconds, respectively. In particular embodiments, a stylus may have a low-power clock with a frequency of, for example, 120-130 kHz. In particular embodiments, a stylus may have multiple high-power clocks, multiple low-power clocks, or both. In particular embodiments, a clock of stylus 20 may be referred to as a stylus clock, a clock generator, or a system clock. In particular embodiments, a stylus-clock signal may have any suitable format (e.g., square wave, triangle wave, sawtooth wave, sinusoidal wave) and any suitable duty cycle (e.g., 25%, 50%, or 75% duty cycle). As an example and not by way of limitation, a stylus clock may produce a periodic two-level digital signal (e.g., a square wave) with alternating rising and falling edges (e.g., transitions from low to high voltages and from high to low voltages, respectively) that occur at regular intervals, and the clock period may be approximately equal to the time interval between consecutive rising edges or consecutive falling edges. As another example and not by way of limitation, a stylus clock may have a clock frequency of 12 MHz (corresponding to a clock period of 1/12 MHz≅83 nanoseconds), and the clock signal may be a square wave with a 50% duty cycle.

In particular embodiments, a clock of stylus 20 may be included as part of controller 50, or a stylus clock may be a separate internal component of stylus 20. As an example and not by way of limitation, a clock of stylus 20 may include a resistor-capacitor (RC) oscillator, a multivibrator, a relaxation oscillator, or any other suitable electronic circuit configured to provide a periodic clock signal. In particular embodiments, a stylus clock may have a particular accuracy, drift, or stability, which represents an amount that the clock's frequency or period may vary over time or with temperature. In particular embodiments, a stylus clock may have a frequency stability of approximately 0.5%, 1%, 2%, 3%, 5%, or any suitable value. As an example and not by way of limitation, stylus 20 may have a clock with a nominal or average frequency of 12 MHz and a 3% variation in clock frequency so that the clock's frequency may vary between approximately 11.6 MHz and 12.4 MHz over a particular time period (e.g., one minute, one hour, or one day) or as temperature varies (e.g., between 10° C. and 40° C.). A 12-MHz clock with a 3% variation may have a clock period that varies between approximately 80.6 nanoseconds and 86.2 nanoseconds. Although this disclosure describes particular stylus clocks having particular frequencies, clock periods, formats, duty cycles, and stabilities, this disclosure contemplates any suitable stylus clocks having any suitable frequencies, clock periods, formats, duty cycles, and stabilities.

Figure 9:
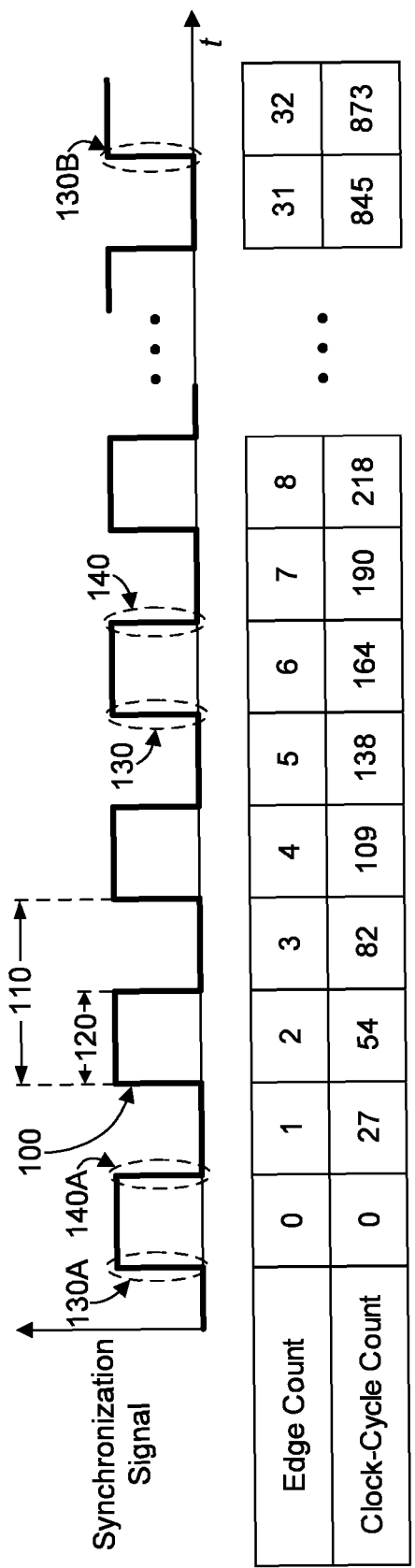
FIG. 9 illustrates an example synchronization signal with corresponding edge and clock-cycle counts.

FIG. 9 illustrates example synchronization signal 100 with corresponding edge and clock-cycle counts. The example of FIG. 9 uses a high-power clock to perform the synchronization. As described more fully herein, a low-power clock may be used to detect signal transmitted from a device, and when the stylus determines that a suitable wake-up condition is met the stylus may power the high-power clock to synchronize the stylus and the device. In particular embodiments, an electronic device may be configured to wirelessly receive synchronization signal 100 from a second device. As an example and not by way of limitation, the electronic device may be a stylus 20 that includes one or more electrodes for wirelessly transmitting signals to or wirelessly receiving signals from a touch sensor 10 of a second computing device. The second computing device may be a personal computing device, such as for example, device 52 illustrated in FIG. 4. As examples and not by way of limitation, the personal computing device may be a portable computing device, mobile phone, smartphone, tablet computer, laptop computer, desktop computer, or any other suitable computing device that includes touch sensor 10 for transmitting signals (e.g., synchronization signal 100) through electrodes of touch sensor 10 or for receiving input via a stylus or a person's touch (e.g., a person's finger). As an example and not by way of limitation, touch sensor 10 of a personal computing device may drive the touch-sensor electrodes with a voltage or current signal corresponding to synchronization signal 100 so that synchronization signal 100 is wirelessly transmitted to stylus 20. The wireless transmission of synchronization signal 100 may include a capacitive coupling between one or more electrodes of touch sensor 10 and one or more electrodes of stylus 20. In the example of FIG. 9, the horizontal axis represents time, and the vertical axis represents an amplitude of a characteristic of synchronization signal 100, such as for example an amplitude of a voltage, electric field, current, or power of synchronization signal 100 as transmitted by device 52 or as received by stylus 20. Although this disclosure describes and illustrates particular synchronization signals transmitted between particular devices in particular manners, this disclosure contemplates any suitable synchronization signals transmitted between any suitable devices in any suitable manners.

In particular embodiments, a synchronization routine may include stylus 20 receiving synchronization signal 100 from touch-sensitive area 54 of device 52 and determining one or more synchronization parameters from synchronization signal 100. In particular embodiments, a synchronization parameter may be related to a particular characteristic of synchronization signal 100, such as for example, a period, frequency, timing, phase, data rate, signal amplitude, jitter, duty cycle, or pulse duration associated with synchronization signal 100. In the example of FIG. 9, synchronization signal 100 has a synchronization-signal period 110 approximately equal to a duration of one cycle of synchronization signal 100. The duration of one cycle of synchronization signal 100 is equal to a duration of time between consecutive rising edges 130 (as illustrated by synchronization signal period 110 in FIG. 9) or consecutive falling edges 140 of synchronization signal 100. The frequency of synchronization signal 100 may be approximately equal to the reciprocal of synchronization-signal period 110. In particular embodiments, synchronization signal 100 may have any suitable format (e.g., square wave, triangle wave, sawtooth wave, sinusoidal wave) and any suitable duty cycle (e.g., 25%, 50%, or 75% duty cycle). In the example of FIG. 9, synchronization signal 100 is a two-level digital signal having a duty cycle of approximately 50% and having a series of alternating rising edges 130 and falling edges 140.

In particular embodiments, synchronization signal 100 may have a half-period 120 which is equal to one half of synchronization-signal period 110. For a synchronization signal 100 with a 50% duty cycle (such as the synchronization signal illustrated in FIG. 9), half-period 120 may be equal to a duration of time between a rising edge 130 and a subsequent falling edge 140 (or the time between a falling edge 140 and a subsequent rising edge 130). In particular embodiments, synchronization signal 100 may have a frequency between approximately 100 kHz and 1 MHz and a synchronization-signal period 110 between approximately 1 and 10 microseconds. As an example and not by way of limitation, synchronization signal 100 may have a frequency of approximately 220 kHz and a corresponding synchronization-signal period 110 of approximately 4.545 µs. Additionally, the corresponding half-period 120 of synchronization signal 100 is approximately 2.273 µs.

In particular embodiments, device 52 may generate a synchronization signal 100 with a particular accuracy, drift, or stability, which represents an amount that the frequency or period of synchronization signal 100 may vary over time or with temperature. In particular embodiments, a synchronization signal 100 may have a frequency stability of 0.5%, 1%, 2%, 3%, 5%, or any suitable value. As an example and not by way of limitation, synchronization signal 100 may have a frequency of 320 kHz (and a corresponding synchronization-signal period 110 of approximately 3.13 µs) and a 3% variation so that the synchronization-signal frequency may vary between approximately 310 kHz and 330 kHz (and the synchronization-signal period may vary between approximately 3.03 µs and 3.22 µs). Although this disclosure describes and illustrates particular synchronization signals having particular frequencies, periods, formats, duty cycles, and stabilities, this disclosure contemplates any suitable synchronization signals having any suitable frequencies, periods, formats, duty cycles, and stabilities.

In particular embodiments, stylus 20 may receive synchronization signal 100 transmitted from touch-sensitive area 54 of device 52. In particular embodiments, based on the received synchronization signal 100, stylus 20 may determine a synchronization parameter that includes an integral multiplier and a fractional portion. In particular embodiments, a synchronization parameter may reflect a relationship between synchronization-signal period 110 and the clock period of a high-power clock. As examples and not by way of limitation, the synchronization parameter may correspond to a duration of time approximately equal to synchronization-signal period 110 or one-half of synchronization-signal period 110. In particular embodiments, the integral multiplier may include a positive integer multiple of the stylus clock period, and the fractional portion may include a fractional portion of the stylus clock period. As an example and not by way of limitation, the integral multiplier may be 27 and may represent 27 clock cycles of the stylus clock (e.g., a duration of time equal to 27×T, where T is the stylus clock period), and the fractional portion may be 0.28 and may represent 0.28 clock cycles (e.g., a duration of time equal to 0.28×T). In particular embodiments, determining a synchronization parameter may include one or more of the following steps: counting the number of stylus clock cycles until a particular quantity of edges of synchronization signal 100 is accumulated; dividing the number of counted clock cycles by the particular quantity of edges to determine a decimal number, the decimal number having an integer part and a fractional part; and assigning the integer part to the positive integer multiple and the fractional part to the fractional portion. As an example and not by way of limitation, stylus 20 may count stylus clock cycles until 1, 5, 10, 25, 50, 100, or 500 edges, or any suitable number of edges of synchronization signal 100 are detected or received by stylus 20. In particular embodiments, the particular quantity of edges accumulated by stylus 20 may equal $2^n$, where n is a positive integer (e.g., the quantity of edges accumulated by stylus may be 2, 4, 8, 16, 32, 64, 128, etc.). Although this disclosure describes and illustrates particular synchronization parameters determined in particular manners, this disclosure contemplates any suitable synchronization parameters determined in any suitable manners.

In the example of FIG. 9, stylus 20 uses the Edge Count parameter to track edges of synchronization signal 100 until a total of 32 edges are detected. In particular embodiments, stylus 20 may track only rising edges 130, only falling edges 140, or both rising edges 130 and falling edges 140 of synchronization signal 100. In particular embodiments, stylus 20 may track rising edges 130 and falling edges 140 separately and may maintain two separate edge counters, one for rising edges 130 and one for falling edges 140. In the example of FIG. 9, stylus 20 counts both rising edges 130 and falling edges 140 together until a total of 32 edges are detected. The duration of time to accumulate the 32 edges corresponds to 32 half-periods 120, which is equal to 16 synchronization-signal periods 110. While accumulating the edges, stylus 20 uses the Clock-Cycle Count parameter to keep track of the number of stylus clock cycles. The Clock-Cycle Count parameter may be used to measure a time interval (e.g., a time interval between two edges of synchronization signal 100) in terms of stylus clock cycles. As an example and not by way of limitation, a counter (represented by Clock-Cycle Count) may be initialized to a value of zero and then, when triggered by an edge of synchronization signal 100 (e.g., rising edge 130A), the counter may begin to accumulate clock-cycle counts. The counter may increment by +1 for each stylus clock cycle. When triggered by another subsequent edge of synchronization signal 100 (e.g., rising edge 130B), the counter may cease accumulating clock-cycle counts, and the value of Clock-Cycle Count may indicate a time interval corresponding to a time between two particular edges of synchronization signal 100. In particular embodiments, the Clock-Cycle Count parameter may be stored in a register or memory location of the processor for later use in determining a synchronization parameter.

In particular embodiments, stylus 20 may begin counting edges after detecting an initial rising edge 130, falling edge 140, or either an initial rising edge 130 or falling edge 140. In FIG. 9, the initial rising edge 130A of synchronization signal 100 (which may be referred to as the initial edge or the zeroth edge) triggers the start of the edge counter and the clock-cycle counter, each of which has an initial value of zero. After the zeroth edge 130A, when the first edge (falling edge 140A) is detected, Edge Count becomes 1 and the Clock-Cycle Count becomes 27, which indicates that 27 stylus clock cycles have occurred between the zeroth edge and the first edge of synchronization signal 100. After the second edge is detected, Edge Count is 2, and Clock-Cycle Count is 54. After each subsequent edge is detected, Edge Count is incremented by 1, and Clock-Cycle Count is updated based on the total number of clock cycles that are counted by stylus 20 since the zeroth edge. As illustrated in FIG. 9, when the eighth edge is detected, Edge Count becomes 8, and Clock-Cycle Count is 218. In FIG. 9, tracking of edges and stylus clock cycles continues until 32 edges are counted. After the 32nd edge (rising edge 130B) is counted, Edge Count is 32, and the total number of stylus clock cycles since the initial rising edge 130A is 873. Although this disclosure describes and illustrates particular parameters used to track or measure particular synchronization signals, this disclosure contemplates any suitable parameters used to track or measure any suitable synchronization signals.

In the example of FIG. 9, synchronization signal 100 may have a frequency of 220 kHz (corresponding to a synchronization-signal period 110 of approximately 4.545 μs), and the stylus clock may have a frequency of 12 MHz (corresponding to a stylus clock period of approximately 83.3 nanoseconds). In FIG. 9, each accumulated edge count corresponds to one half-period 120 of synchronization signal or, equivalently, one half of synchronization-signal period 110. The duration of time to accumulate 32 edges corresponds to 32 half-periods 120 or, equivalently, 16 synchronization-signal periods 110. Based on the edge counts, the total duration of time to accumulate 32 edges is approximately 16×4.545 μs≅72.7 μs. Similarly, the corresponding total duration of time to accumulate the 873 clock cycles is approximately 873×83.3 ns=72.7 μs, which is consistent with the previous 72.7 μs time calculated based on edge counts.

Herein, reference to a computer-readable non-transitory storage medium or media may include one or more semiconductor-based or other integrated circuits (ICs) (such as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A stylus comprising:
a receiver operable to receive one or more signals transmitted wirelessly from a device; and
circuitry conductively coupled to the receiver, the circuitry configured to perform operations comprising:
alternating, during a first period of time, a power supplied to the receiver between a first power for a first duration and a second power for a second duration, wherein the first power is greater than the second power;
determining, for each instance of the first duration, a value identifying a quantity of events received by the receiver during that instance, each event being based on a characteristic of a received signal meeting an event criteria;
determining, for each instance of the first duration, whether value identifying the quantity of events received by the receiver during that instance exceeds a threshold value;
initiating, based at least on the value identifying the quantity of events received by the receiver during that instance exceeding the threshold value, provision of a third power to one or more stylus components for communicating with the device, wherein the third power is greater than the first power;
determining whether the first period of time has expired; and
providing, based at least on determining that the first period of time has expired, the receiver with the second power for a second period of time, wherein the first duration and the second duration are each less than the second period of time.

2. The stylus of claim 1, wherein the circuitry is further configured to:
determine whether the second period of time has expired; and
perform, based at least on determining that the second period of time has expired, the operations.

3. The stylus of claim 2, wherein the circuitry is further configured to:
determine whether a third period of time encompassing the first and second periods of time has expired; and
provide, based at least on determining that the third period of time has expired, the second power to the receiver for a fourth period of time.

4. The stylus of claim 2, wherein:
the signals are transmitted periodically by the device;
the first period of time and the second period of time alternate periodically; and
if the first period of time occurs during a time that the signals are not transmitted, then a stylus duration that comprises a duration of the first period of time plus a duration of the second period of time is not substantially equal to a device duration that comprises a duration of time that the signals are transmitted plus a duration of time that the signals are not transmitted.

5. The stylus of claim 1, wherein the circuitry configured to determine, for each instance of the first duration, a value identifying a quantity of events received by the receiver during that instance comprises a digital asynchronous filter conductively coupled to the receiver.

6. The stylus of claim 1, wherein:
the device comprises a touch sensor;
the signals transmitted wirelessly to the device comprise a substantially square-wave electromagnetic signal; and
the receiver comprises an edge detector.

7. The stylus of claim 1, wherein:
the receiver comprises:
one or more amplifiers configured to amplify the one or more signals received by the stylus; and
circuitry configured to determine whether the characteristic of a received signal meets an event criteria; and
the stylus components for communicating with the device are conductively coupled to the receiver.

8. The stylus of claim 1, wherein one or more of the following is configurable by the stylus:
the first duration;
the second duration;
the first period of time; and
the second period of time.

9. The stylus of claim 8, wherein, for each instance of the first duration:
the first duration comprises a fixed duration when the value identifying the quantity of events is not greater than a first number that is less than the threshold value; and
the first duration comprises the fixed duration plus an additional duration when the value is greater than the first number.

10. The stylus of claim 8, wherein, for each instance of the first duration:
the first duration comprises a fixed duration when the value identifying the quantity of events is not greater than a first number that is less than the threshold value; and
another instance of the first duration is begun when the value is greater than the first number.

11. The stylus of claim 8, wherein:
the signals comprise signals periodically transmitted for a third duration by the device; and
the first period of time is based on one or more of:
the third duration; and
a length of time between periods of transmission.

12. One or more non-transitory storage media embodying instructions that are operable when executed to perform operations comprising:
alternating, during a first period of time, a power supplied to a stylus receiver between a first power for a first duration and a second power for a second duration, wherein the first power is greater than the second power;
determining, for each instance of the first duration, a value identifying a quantity of events received by the receiver during that instance, each event being based on a characteristic of a received signal meeting an event criteria;
determining, for each instance of the first duration, whether value identifying the quantity of events received by the receiver during that instance exceeds a threshold value;
initiating, based at least on the value identifying the quantity of events received by the receiver during that instance exceeding the threshold value, provision of a third power to one or more stylus components for communicating with the device, wherein the third power is greater than the first power;
determining whether the first period of time has expired; and
initiating, based at least on determining that the first period of time has expired, provision of second power to the receiver for a second period of time, wherein the first duration and the second duration are each less than the second period of time.

13. The media of claim 12, wherein the instructions are further operable when executed to:
determine whether the second period of time has expired; and
perform, based at least on determining that the second period of time has expired, the operations.

14. The media of claim 13, wherein the instructions are further operable when executed to:
determine whether a third period of time encompassing the first and second periods of time has expired; and
initiate, based at least on determining that the third period of time has expired, provision of the second power to the receiver for a fourth period of time.

15. The media of claim 13, wherein:
the signals are transmitted periodically by the device;
the first period of time and the second period of time alternate periodically; and
if the first period of time occurs during a time that the signals are not transmitted, then a stylus duration that comprises a duration of the first period of time plus a duration of the second period of time is not substantially equal to a device duration that comprises a duration of time that the signals are transmitted plus a duration of time that the signals are not transmitted.

16. The media of claim 12, wherein the instructions are further operable when executed to configure one or more of the following:
the first duration;
the second duration;
the first period of time; and
the second period of time.

17. The media of claim 16, wherein, for each instance of the first duration:
the first duration comprises a fixed duration when the value identifying the quantity of events is not greater than a first number that is less than the threshold value; and
the first duration comprises the fixed duration plus an additional duration when the value is greater than the first number.

18. The media of claim 16, wherein, for each instance of the first duration:
the first duration comprises a fixed duration when the value identifying the quantity of events is not greater than a first number that is less than the threshold value; and
another instance of the first duration is begun when the value is greater than the first number.

19. The media of claim 16, wherein:
the signals comprise signals periodically transmitted for a third duration by the device; and
the first period of time is based on one or more of:
the third duration; and
a length of time between periods of transmission.

20. A method comprising:
alternating, during a first period of time, a power supplied to a stylus receiver between a first power for a first duration and a second power for a second duration, wherein the first power is greater than the second power;
determining, for each instance of the first duration, a value identifying a quantity of events received by the receiver during that instance, each event being based on a characteristic of a received signal meeting an event criteria;

determining, for each instance of the first duration, whether value identifying the quantity of events received by the receiver during that instance exceeds a threshold value;

initiating, based at least on the value identifying the quantity of events received by the receiver during that instance exceeding the threshold value, provision of a third power to one or more stylus components for communicating with the device, wherein the third power is greater than the first power;

determining whether the first period of time has expired; and providing, based at least on determining that the first period of time has expired, the receiver with the second power for a second period of time, wherein the first duration and the second duration are each less than the second period of time.

* * * * *